United States Patent
Evetts et al.

(10) Patent No.: US 10,619,569 B2
(45) Date of Patent: Apr. 14, 2020

(54) GAS TURBINE ENGINE AND METHOD TO COOL A GAS TURBINE ENGINE CASE ASSEMBLY

(71) Applicant: United Technologies Corporation, Farmington, CT (US)

(72) Inventors: Joseph D. Evetts, Glastonbury, CT (US); William J. Riordan, Coventry, CT (US); Federico Papa, Ellington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 318 days.

(21) Appl. No.: 15/185,820

(22) Filed: Jun. 17, 2016

(65) Prior Publication Data

US 2017/0363003 A1 Dec. 21, 2017

(51) Int. Cl.
| | |
|---|---|
| F02C 7/12 | (2006.01) |
| F02C 7/18 | (2006.01) |
| F02C 6/08 | (2006.01) |
| B64D 29/00 | (2006.01) |
| F01D 25/24 | (2006.01) |
| F02C 3/04 | (2006.01) |
| F02C 9/18 | (2006.01) |
| B64D 13/08 | (2006.01) |
| F01D 11/24 | (2006.01) |

(52) U.S. Cl.
CPC ............. *F02C 7/12* (2013.01); *B64D 29/00* (2013.01); *F01D 25/24* (2013.01); *F02C 3/04* (2013.01); *F02C 6/08* (2013.01); *F02C 7/18* (2013.01); *F02C 9/18* (2013.01); *B64D 13/08* (2013.01); *F01D 11/24* (2013.01); *F02C 7/185* (2013.01); *F05D 2220/32* (2013.01); *F05D 2260/20* (2013.01); *F05D 2270/80* (2013.01); *Y02T 50/675* (2013.01)

(58) Field of Classification Search
CPC ...... F02C 6/08; F02C 7/12; F02C 9/18; F02C 7/185; F01D 11/24; B64D 13/08
See application file for complete search history.

(56) References Cited

U.S. PATENT DOCUMENTS

| | | |
|---|---|---|
| 5,357,742 A | 10/1994 | Miller |
| 6,202,403 B1 | 3/2001 | Laborie et al. |
| 2007/0245739 A1* | 10/2007 | Stretton ................ F01D 17/105 60/728 |

(Continued)

OTHER PUBLICATIONS

European Search Report for European Patent Application No. 17176680.1 dated Nov. 13, 2017, 7 pages.

*Primary Examiner* — Gerald L Sung
*Assistant Examiner* — Alyson Joan Harrington
(74) *Attorney, Agent, or Firm* — Cantor Colburn LLP

(57) ABSTRACT

A method of cooling a gas turbine engine case assembly includes moving a fan air valve that is operatively connected to a precooler having a bypass inlet that is configured to receive bypass air that bypasses a gas turbine engine core to facilitate a provision of bypass air through a fan air valve inlet to the bypass inlet to a first open position, in response to a core compartment temperature being greater than a target core compartment temperature. The method further includes bleeding the bypass air through a bypass outlet of the precooler into a core compartment.

8 Claims, 3 Drawing Sheets

(56) References Cited

U.S. PATENT DOCUMENTS

| | | | |
|---|---|---|---|
| 2010/0043540 A1* | 2/2010 | Ruston | F02C 9/16 |
| | | | 73/112.01 |
| 2010/0192593 A1* | 8/2010 | Brown | F02C 6/08 |
| | | | 60/782 |
| 2013/0175001 A1* | 7/2013 | Cheong | F02C 7/185 |
| | | | 165/41 |
| 2014/0083106 A1* | 3/2014 | Mackin | F28F 3/025 |
| | | | 60/772 |
| 2015/0267616 A1 | 9/2015 | Verseux | |
| 2015/0275769 A1* | 10/2015 | Foutch | F02C 9/18 |
| | | | 60/776 |
| 2016/0017804 A1* | 1/2016 | Afrianto | F02C 6/08 |
| | | | 60/39.092 |
| 2016/0123185 A1 | 5/2016 | Le Pache et al. | |

\* cited by examiner

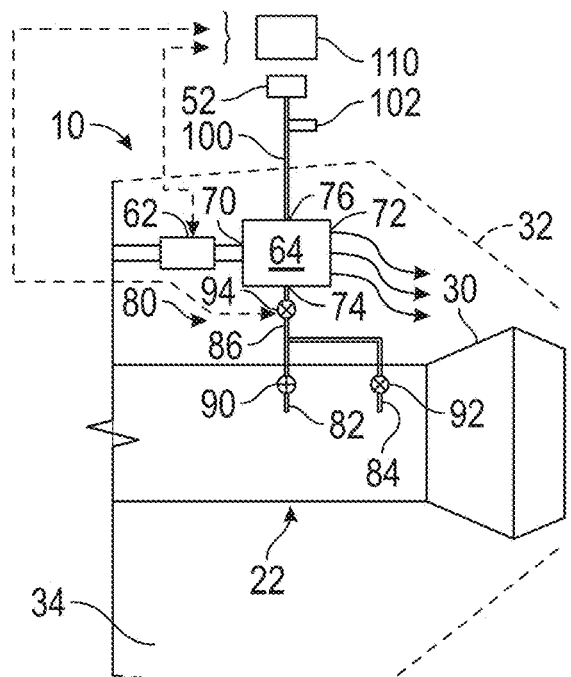
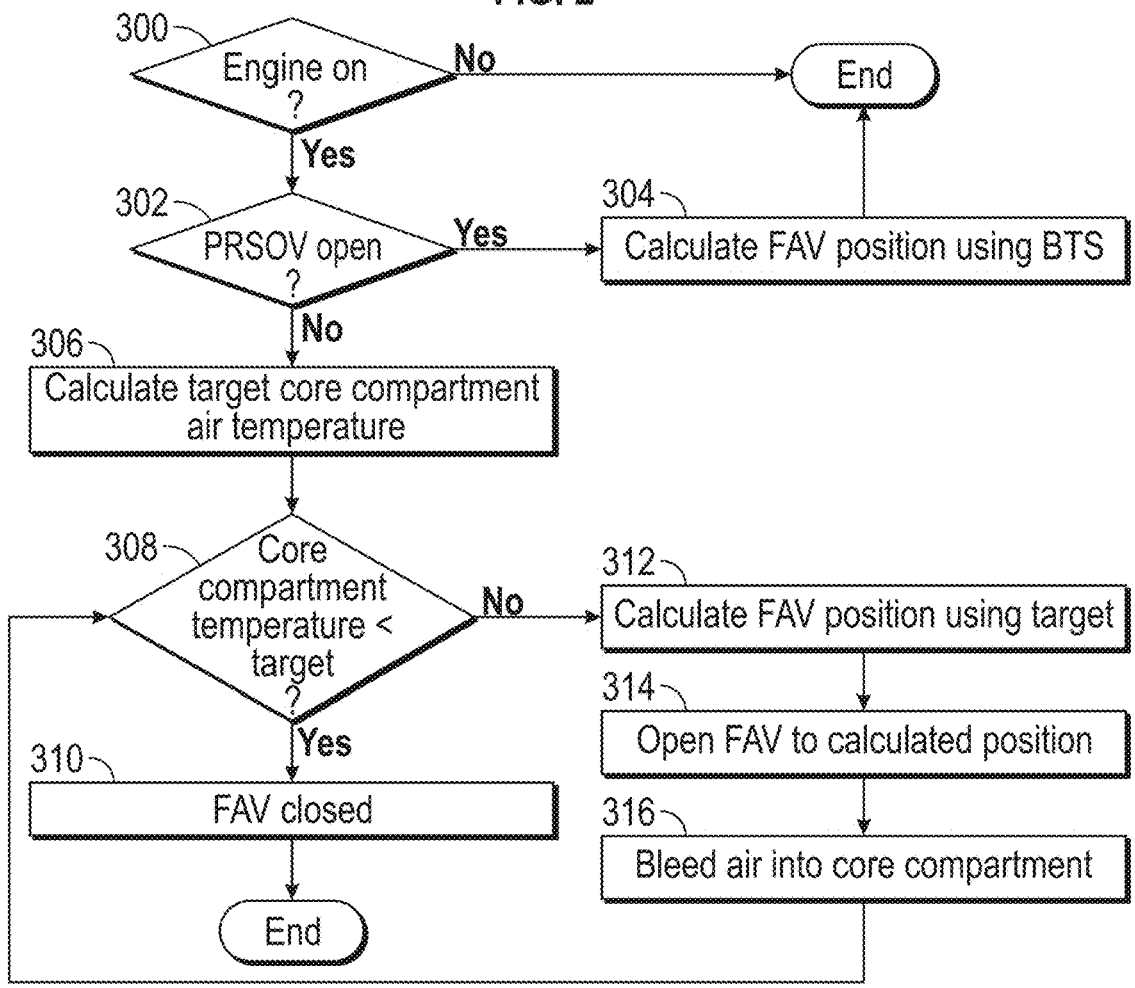
FIG. 2
FIG. 3

GAS TURBINE ENGINE AND METHOD TO COOL A GAS TURBINE ENGINE CASE ASSEMBLY

BACKGROUND

Aircraft are commonly provided with environmental control systems that maintain an aircraft cabin air pressure and temperature within a target range. The environmental control system receives bleed air from compressor stages of a gas turbine engine that propels the aircraft. These environmental control systems also receive bypass air that bypasses the gas turbine engine core and use this bypass air to cool the compressor air before delivery to the cabin. The bleed air and the bypass air are directed to the environmental control system through pressure lines or plenums. Some of these environmental control systems will exhaust the spent bypass air into the engine core compartment, in the vicinity of the core engine cases, in order to achieve some thrust recovery through the core compartment aft vent. This spent bypass air can have a significant cooling effect on the core engine cases. During some operational points of the aircraft, the environment control system is not used to maintain the aircraft cabin air pressure and temperature and spent bypass air is therefore not being exhausted into the vicinity of the core engine cases. It is during these operational points of the aircraft, high pressure turbine and low pressure turbine case clearances and case temperatures may need to be further controlled.

Accordingly, it is desirable to provide a system and a method to control the high pressure turbine and low pressure turbine case clearances and case temperatures when the environmental control system is not actively being used by the aircraft.

BRIEF DESCRIPTION

In some aspects of the disclosure, a gas turbine engine is provided. The gas turbine engine includes a case assembly, a precooler, a fan air valve, a bleed air conduit, and a controller. The assembly is disposed about a gas turbine engine core that is disposed within a cowl. The cowl defines a core compartment. The precooler has a bypass inlet, a bleed air inlet, a bleed air outlet that is operatively connected to an environmental control system, and a bypass outlet. The fan air valve is operatively connected to the bypass inlet. The fan air valve is configured to selectively inhibit and facilitate a provision of bypass air to the precooler. The bleed air conduit has a pressure regulating/shut-off valve operatively connected to the bleed air inlet and a compressor section of the gas turbine engine core. The pressure regulating/shut-off valve being movable between an open position that facilitates a flow of bleed air from the compressor section to the precooler and a closed position that inhibits the flow of bleed air from the compressor section to the precooler. The controller is in communication with the fan air valve and the pressure regulating/shut-off valve. The controller is configured to operate the fan air valve to facilitate the provision of bypass air to the precooler and the bypass outlet provides bypass air to the core compartment, in response to the pressure regulating/shut-off valve being in the closed position and a core compartment temperature being greater than a target core compartment temperature.

In addition to one or more of the features described above, or as an alternative to any of the foregoing embodiments, a temperature sensor is positioned to measure the core compartment temperature.

In addition to one or more of the features described above, or as an alternative to any of the foregoing embodiments, the target core compartment temperature is based on a rotational speed of the gas turbine engine and an ambient air temperature.

In addition to one or more of the features described above, or as an alternative to any of the foregoing embodiments, the controller is further configured to operate the fan air valve to inhibit the provision of bypass air to the precooler and the bypass outlet ceases the provision of bypass air to the core compartment, in response to the core compartment temperature becoming less than the target core compartment temperature.

In addition to one or more of the features described above, or as an alternative to any of the foregoing embodiments, the bleed air conduit includes a first bleed air line having a first valve configured to provide low pressure bleed air from a low pressure stage of the compressor section of the gas turbine engine core; a second bleed air line having a second valve configured to provide high pressure bleed air from a high pressure stage disposed downstream of the low pressure stage of the compressor section; and a bleed air union operatively connected to the first bleed air line, the second bleed air line, and the bleed air inlet.

In some aspects of the disclosure, a method of cooling a gas turbine engine case assembly. The method includes moving a fan air valve that is operatively connected to a precooler having a bypass inlet that is configured to receive bypass air that bypasses a gas turbine engine core to facilitate a provision of bypass air through a fan air valve inlet to the bypass inlet to a first open position, in response to a core compartment temperature being greater than a target core compartment temperature. The method further includes bleeding the bypass air through a bypass outlet of the precooler into a core compartment.

In addition to one or more of the features described above, or as an alternative to any of the foregoing embodiments, the method further includes monitoring a core compartment temperature with a temperature sensor positioned within the core compartment.

In addition to one or more of the features described above, or as an alternative to any of the foregoing embodiments, the method further includes moving the fan air valve to a closed position to inhibit the provision of bypass air through the fan air valve inlet to the bypass inlet, in response to the core compartment temperature satisfying the target core compartment temperature.

In addition to one or more of the features described above, or as an alternative to any of the foregoing embodiments, the method further includes moving the fan air valve to a second open position to facilitate the provision of bypass air through the fan air valve inlet to the bypass inlet, in response to a bleed air conduit having a pressure regulating/shut-off valve operatively connected to a bleed air inlet of the precooler and a compressor section of the gas turbine engine core.

In addition to one or more of the features described above, or as an alternative to any of the foregoing embodiments, the second open position of the fan air valve is based on a temperature of bleed air supplied through the bleed air conduit.

In addition to one or more of the features described above, or as an alternative to any of the foregoing embodiments, the target core compartment temperature is based on at least one of a gas turbine engine rotational speed, an altitude, an aircraft mach number, and an ambient air temperature.

In addition to one or more of the features described above, or as an alternative to any of the foregoing embodiments, the gas turbine engine rotational speed is based on a rotational speed of at least one of a low pressure shaft and a high pressure shaft.

In some aspects of the disclosure, a method of cooling a gas turbine engine case assembly is provided. The method includes monitoring a core compartment temperature. Calculating a target core compartment temperature. Comparing the core compartment temperature to the target core compartment temperature, in response to a pressure regulating/shut-off valve operatively connected to a bleed air inlet of a precooler being in a closed position. Calculating a fan air valve position of a fan air valve operatively connected to the precooler based on the target core compartment temperature, in response to the core compartment temperature being greater than the target core compartment temperature.

In addition to one or more of the features described above, or as an alternative to any of the foregoing embodiments, the method further includes moving the fan air valve to the calculated fan air valve position; and bleeding bypass air from the precooler into a core compartment at least until the core compartment temperature satisfies the target core compartment temperature.

In addition to one or more of the features described above, or as an alternative to any of the foregoing embodiments, the method further includes closing the fan air valve in response to the core compartment temperature becoming less than the target core compartment temperature.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

FIG. 2 is a partial schematic view of the gas turbine engine;

FIG. 3 is a flowchart illustrating a method of cooling a gas turbine engine case assembly.

DETAILED DESCRIPTION

Referring now to the Figures, where the present disclosure will be described with reference to specific embodiments, without limiting same, it is to be understood that the disclosed embodiments are merely illustrative and may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
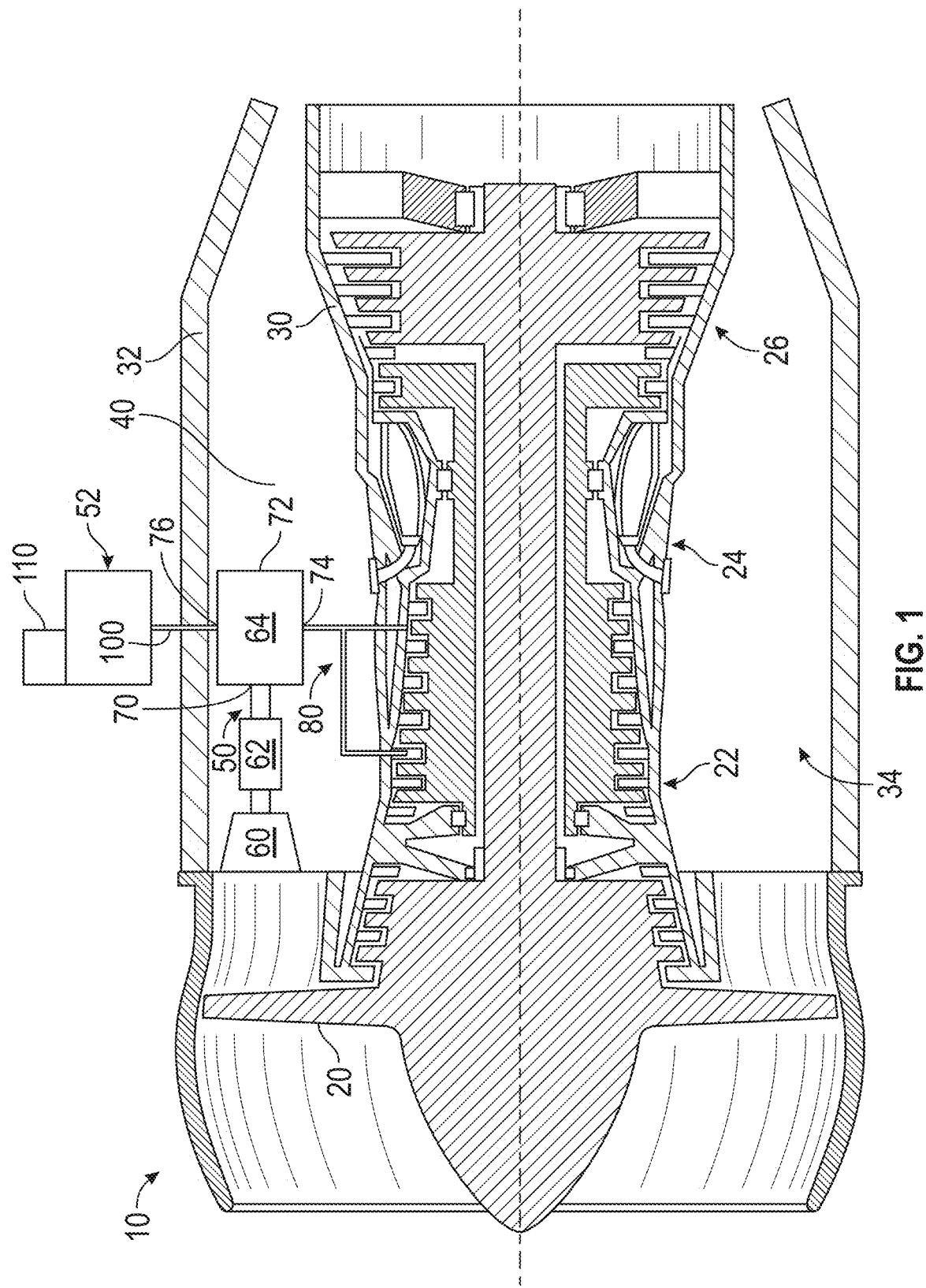
FIG. 1 is a schematic view of a gas turbine engine.

Referring to FIG. 1, a schematic view of a gas turbine engine 10 is shown. The gas turbine engine 10 is connected to a pylon that is connected to the aircraft body/fuselage or an aircraft wing. The gas turbine engine 10 includes a fan 20, a compressor section 22, a combustor section 24, and a turbine section 26. The compressor section 22, the combustor section 24, and the turbine section 26 are disposed within a case assembly 30 and define a gas turbine engine core. A cowl 32 defines a core compartment 34 that is configured to receive the gas turbine engine core.

The fan 20 directs ambient air towards the gas turbine engine core. The fan 20 directs bypass air that bypasses the gas turbine engine core into a bypass duct 40 defined between an exterior surface of the case assembly 30 and an interior surface of the cowl 32. Intake air is compressed by the compressor section 22 and is directed to the combustor section 24. Within the combustor section 24 the compressed air is heated. The heated compressed air is directed to the turbine section 26 where the energy is extracted by a plurality of turbine blades of the turbine section 26. The fan 20, the compressor section 22, and the turbine section 26 are configured to rotate relative to each other.

The compressor section 22 may include a low pressure stage operatively connected to a low pressure compressor rotor and a high pressure stage operatively connected to a high pressure compressor rotor disposed downstream of the low pressure compressor stage. The turbine section 26 may include a low pressure turbine section connected to a low pressure turbine rotor and a high pressure turbine section connected to a high pressure turbine rotor. A low pressure shaft or a low pressure spool may interconnect the low pressure compressor rotor and the low pressure turbine rotor. A high pressure shaft or a high pressure spool may interconnect the high pressure compressor rotor and the high pressure turbine rotor.

A bleed air conditioning system 50 is disposed within the core compartment 34 and within the bypass duct 40. The bleed air conditioning system 50 is operatively connected to an environmental control system 52. The bleed air conditioning system 50 includes a fan air valve inlet 60, a fan air valve 62, and a precooler 64.

The fan air valve inlet 60 is disposed proximate an inlet to the gas turbine engine core within the bypass duct 40. The fan air valve inlet 60 is configured to direct bypass air to the fan air valve 62 through a first fan air duct disposed between the fan air valve inlet 60 and the fan air valve 62. The fan air valve 62 is configured to selectively inhibit or facilitate a flow of bypass air received through the fan air valve inlet 60 to the precooler 64 through a second fan air duct disposed between the fan air valve 62 and the precooler 64. The environmental control system 52 is in communication with the fan air valve 62 and is configured to control a position of the fan air valve 62 to adjust the flow of bypass air provided to the precooler 64. The fan air valve 62 is movable between a closed position and a plurality of open positions.

The precooler 64 is configured to condition (heat or cool) bleed air and bypass air that is provided to the environmental control system 52. The precooler 64 is configured as an air to air heat exchanger having a bypass inlet 70, a bypass outlet 72, a bleed air inlet 74, and a bleed air outlet 76.

Figure 4:
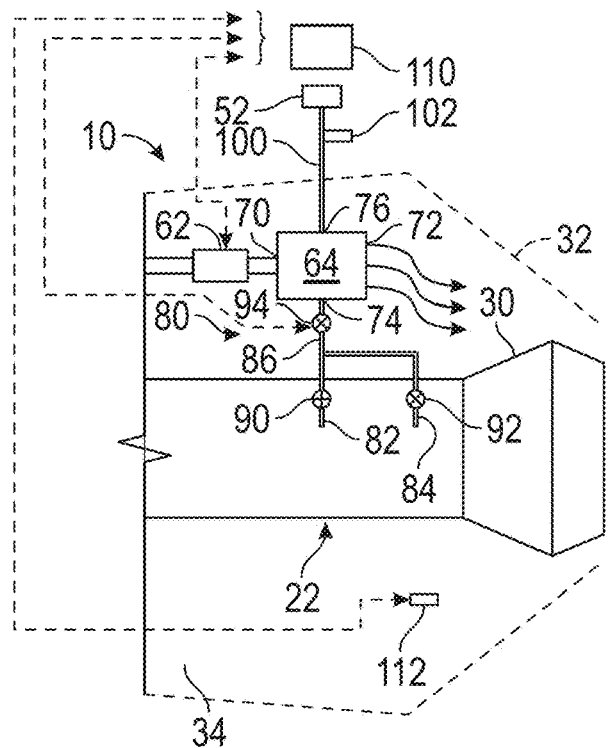
FIG. 4 is a partial schematic view of another embodiment of the gas turbine engine.

Referring to FIGS. 1, 2, and 4, the bypass inlet 70 is fluidly connected to an outlet of the fan air valve 62. The bypass outlet 72 is disposed opposite the bypass inlet 70 and is configured to dump or bleed bypass air into the core compartment 34. The bypass air flows through a cold side of the precooler 64. The bypass air that exits through the bypass outlet 72 may act to cool the core compartment 34 and may impinge on the case assembly 30 proximate the turbine section 26 of the gas turbine engine core. The impingement of the bypass air on the case assembly 30 may cool the case assembly 30. The cooling of the case assembly 30 by the bypass air may aid in maintaining or controlling high pressure turbine and low pressure turbine clearances between the case assembly and tips of the turbine blades associated with the high pressure turbine and a low pressure turbine. The cooling of the case assembly 30 by the bypass air may aid in maintaining or satisfying case assembly containment requirements.

The bleed air inlet 74 is operatively connected to the compressor section 22 of the gas turbine engine core through a bleed air conduit 80. The bleed air conduit 80 includes a first bleed air line 82, a second bleed air line 84, and a bleed air union line 86.

The first bleed air line 82 is configured as a low pressure bleed air line that is operatively connected to the low pressure stage of the compressor section 22. The first bleed air line 82 includes a first valve 90 configured as a check valve configured to inhibit high pressure bleed air from the (high pressure bleed line) second bleed air line 84 from flowing into the low pressure stage of the compressor section 22 when a (high pressure bleed air valve) second valve 92 is open. The low pressure bleed air from the low pressure stage of the compressor section 22 may have a first temperature.

The second bleed air line 84 is configured as a high pressure bleed air line that is operatively connected to the high pressure stage of the compressor section 22. The second bleed air line 84 includes a second valve 92 that is configured to selectively provide a flow of high pressure bleed air from the high pressure state of the compressor section 22 to the bleed air union line 86. The high pressure bleed air from the high pressure stage of the compressor section 22 may have a second temperature that is greater than the first temperature.

The first bleed air line 82 and the second bleed air line 84 are each connected to the bleed air union line 86. The bleed air union line 86 operatively connects the first bleed air line 82 and the second bleed air line 84 to the bleed air inlet 74 of the precooler 64. The bleed air union line 86 includes a pressure regulating/shut-off valve (PRSOV) 94 that is configured to regulate system pressure to the aircraft to ensure a threshold level of pressure to meet aircraft environmental control system requirements while preventing over-pressurization of environmental control system components. The pressure regulating/shut-off valve 94 will close if bleed air to the aircraft is not requested, i.e. when the environmental control system 52 is off.

The bleed air supplied through the bleed air inlet 74 of the precooler 64 passes through a hot side of the precooler 64 to the bleed air outlet 76. The bleed air outlet 76 is operatively connected to the environmental control system 52 through a conditioned bleed air line 100. The conditioned bleed air line 100 includes a bleed air temperature sensor (BTS) 102 positioned to monitor a temperature of a flow of bleed air supplied to the environmental control system 52. The environmental control system 52 is in communication with the bleed air temperature sensor 102. The bleed air supplied or provided through the bleed air inlet 74 of the precooler 64 may have a higher temperature than the bypass air supplied or provided through the bypass inlet 70 of the precooler 64. The environmental control system 52 may adjust the provision of bypass air supplied or provided to the bypass inlet 70 of the precooler 64 by adjusting an open position of the fan air valve 62 to decrease or increase the temperature of the bleed air supplied or provided to the environmental control system 52, when the environmental control system 52 is on.

In at least one embodiment, a controller 110 is provided. The controller 110 may be provided as a component of the environmental control system 52 or as a component of an overall monitoring system. The controller 110 is in communication with the bleed air conditioning system 50, the environmental control system 52, and a temperature sensor 112. Referring to FIG. 4, the temperature sensor 112 is positioned to monitor a core compartment temperature. Referring to FIG. 2 the temperature sensor 112 may not be provided and the controller 110 is configured to estimate or calculate the temperature of the core compartment 34 based on a gas turbine engine rotational speed, an ambient air temperature or outside air temperature (external to the gas turbine engine 10), and/or an aircraft mach number or speed at altitude. The gas turbine engine rotational speed may be based on a rotational speed of a low pressure shaft or low pressure compressor/turbine rotor and a high pressure shaft or a high pressure compressor/turbine rotor.

The controller 110 is configured to control the temperature of the case assembly 30 or the core compartment 34 during operational states of the gas turbine engine 10 when the environmental control system 52 is off. The controller 110 is configured to operate the fan air valve 62 to move to a calculated fan air valve position that is an open position to provide bypass air to the precooler 64 that in turn provides or bleeds bypass air into the core compartment 34 to reduce or control the case assembly 30 or the core compartment 34 temperature, in response to the pressure regulating/shut-off valve 94 being in a closed position and a core compartment temperature being greater than a target core compartment temperature.

The controller 110 is further configured to operate the fan air valve 62 to move towards a closed position to inhibit the provision of bypass air to the precooler 64 that in turn ceases the provision of bypass air to the core compartment 34, in response to the core compartment temperature satisfying or being less than the target core compartment temperature.

Figure 5:
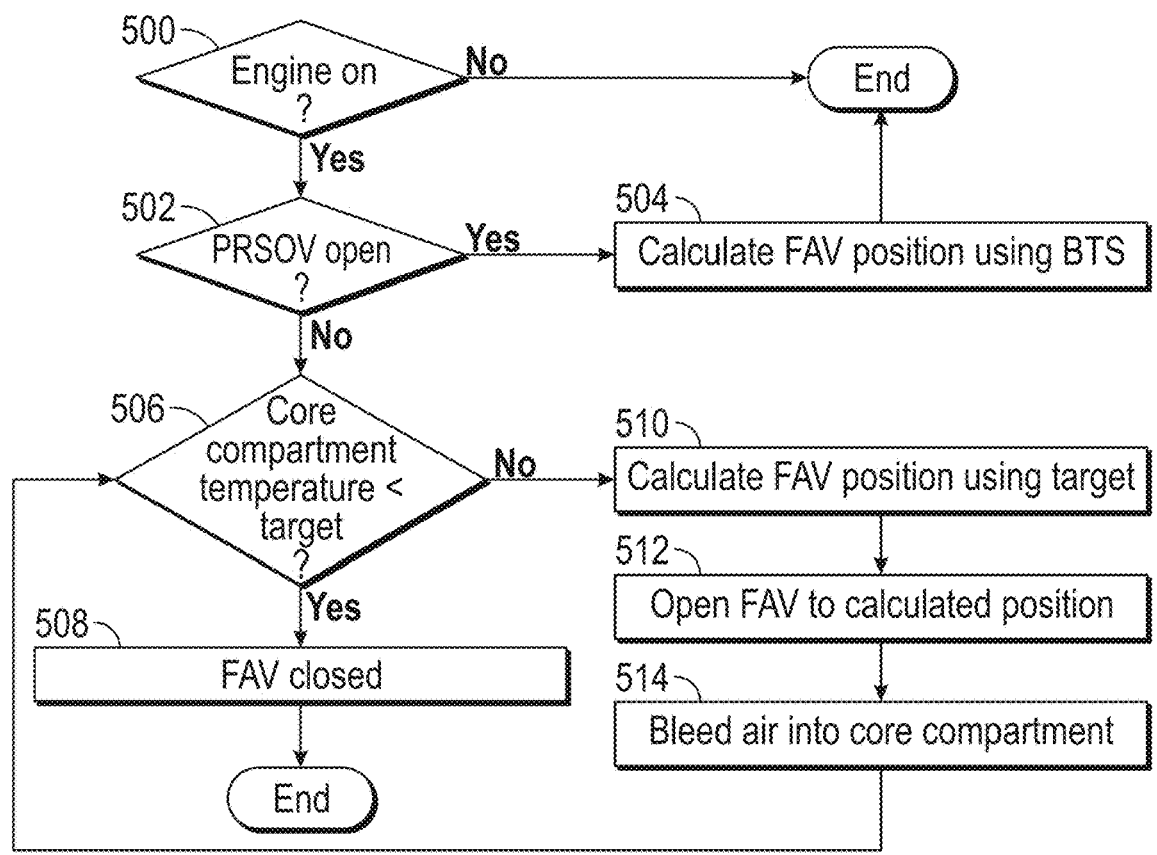
FIG. 5 is a flowchart illustrating another method of cooling a gas turbine engine case assembly.

Referring to FIGS. 3 and 5, flowcharts of illustrative methods of cooling a gas turbine engine case assembly 30 or cooling a core compartment 34 is shown. As will be appreciated by one of ordinary skill in the art, the flowchart represents control logic that may be implemented or affected in hardware, software, or a combination of hardware and software that is embodied within the controller 110 or the environmental control system 52. The control logic may be implemented using any of a number of known programming and processing techniques or strategies and is not limited to the order or sequence illustrated. Parallel processing, multitasking or multi-threaded systems and methods may be employed.

The control logic may be independent of a particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the same method of control. The illustrated functions may be modified or in some cases omitted, without departing from the scope intended.

Referring to FIG. 3, a method of cooling a gas turbine engine case assembly 30 or core compartment 34 without the use of the temperature sensor 112 is illustrated. At block 300, the method assesses the operational state of the gas turbine engine 10, which may include assessing whether the gas turbine engine 10 is functional. Should the gas turbine engine 10 be off, the method may end. If the gas turbine engine 10 is on and operational, the method may continue to block 302.

At block 302, the method may assess whether the environmental control system 52 is on and operational by assessing the position of the pressure regulating/shut-off valve 94. Should the pressure regulating/shut-off valve 94 be in an open position, the method may continue to block 304. At block 304, the method calculates an open position of the fan air valve 62 based on a temperature of bleed air monitored by the bleed air temperature sensor 102. The open position of the fan air valve 62 may adjust the temperature of the bleed air supplied to the environmental control system 52. As well, the precooler 64 may exhaust higher temperature air into the core compartment 34 than if the pressure regulating/shut-off valve 94 were in a closed position.

Returning to block 302, if the pressure regulating/shut-off valve 94 is in a closed position, the method may continue to block 306. At block 306, the method may calculate a target core compartment temperature based on a low pressure shaft or low pressure compressor/turbine rotor speed, a high pressure shaft or a high pressure compressor/turbine rotor speed, an ambient or outside air temperature, and/or an aircraft Mach number or speed at altitude. At block 308 the method may assess whether an estimated core compartment temperature is less than the target core compartment temperature. The estimated core compartment temperature may be based on the above-mentioned variables as well as a correlation using engine testing and development data. Should the estimated core compartment temperature be less than the target core compartment temperature, the fan air valve 62 may be closed at block 310 and the method may end. If the estimated core compartment temperature is greater than the target core compartment temperature, the method may continue to block 312.

At block 312, the method may calculate a fan air valve 62 open position based on the target core compartment temperature. At block 314, the method may move or open the fan air valve 62 to the calculated open position. At block 316, the moving of the fan air valve 62 to the calculated open position facilitates or enables the bleeding of the cooler bypass air supplied through the fan air valve inlet 60 through the fan air valve 62 to the precooler 64 and into the core compartment 34. The bypass air may impinge on the gas turbine engine case assembly 30 to cool the case assembly 30. The bypass air may also reduce a core compartment temperature. The method may return to block 308 to assess whether the estimated core compartment temperature is less than or satisfies a target core compartment temperature. Should the estimated core compartment temperature be less than the target core compartment temperature, the fan air valve 62 may be closed and the method may end.

Referring to FIG. 5, a method of cooling a gas turbine engine case assembly 30 or core compartment 34 with the use of the temperature sensor 112 is illustrated. At block 500, the method assesses the operational state of the gas turbine engine 10, which may include assessing whether the gas turbine engine 10 is on and functional. Should the gas turbine engine 10 be off, the method may end. If the gas turbine engine 10 is on and operational, the method may continue to block 502.

At block 502, the method may assess whether the environmental control system 52 is on and operational by assessing the position of the pressure regulating/shut-off valve 94. Should the pressure regulating/shut-off valve 94 be in an open position, the method may continue to block 504. At block 504, the method calculates an open position of the fan air valve 62 based on a bleed air temperature monitored by the bleed air temperature sensor 102. The open position of the fan air valve 62 may adjust the bleed air temperature supplied to the environmental control system 52.

Returning to block 502, if the pressure regulating/shut-off valve 94 is in a closed position, the method may continue to block 506. The method may monitor the core compartment temperature with the temperature sensor 112 and may calculate a target core compartment temperature substantially simultaneously or prior to continuing to block 506. The target core compartment temperature may be based on a low pressure shaft or low pressure compressor/turbine rotor speed, a high pressure shaft or a high pressure compressor/turbine rotor speed, an ambient or outside air temperature, and/or an aircraft Mach number or speed at altitude. At block 506 the method may assess whether the measured core compartment temperature is less than the target core compartment temperature. Should the measured core compartment temperature be less than the target core compartment temperature, the fan air valve 62 may be closed at block 508 and the method may end. If the estimated core compartment temperature is greater than the target core compartment temperature, the method may continue to block 510.

At block 510, the method may calculate a fan air valve 62 open position based on the target core compartment temperature. At block 512, the method may move or open the fan air valve 62 to the calculated open position. At block 514, the moving of the fan air valve 62 to the calculated open position facilitates or enables the bleeding of cooler bypass air supplied through the fan air valve inlet 60 through the fan air valve 62 to the precooler 64 and into the core compartment 34. The bypass air may impinge on the gas turbine engine case assembly 30 to cool the case assembly 30. The bypass air may also reduce a core compartment temperature. The method may return to block 506 to assess whether the estimated core compartment temperature is less than or satisfies a target core compartment temperature. Should the estimated core compartment temperature be less than the target core compartment temperature, the fan air valve 62 may be closed and the method may end.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments or combinations of the described embodiments. Accordingly, the present disclosure is not to be seen as limited by the foregoing description, but is only limited by the scope of the appended claims.

The invention claimed is:
1. A method of cooling a gas turbine engine case assembly, comprising:
calculating an open position of a fan air valve being operatively connected to a precooler having a bypass inlet configured to receive bypass air that bypasses a gas turbine engine core to facilitate a provision of bypass air through a fan air valve inlet to the bypass inlet to a first open position, responsive to a pressure regulating/shut-off valve being in a closed position to inhibit a fluid flow through a bleed air inlet of the precooler;
monitoring a core compartment temperature of a core compartment with a temperature sensor positioned within the core compartment;

when the pressure regulating/shut-off valve is in the closed position and the core compartment temperature is greater than a target core compartment temperature, moving the fan air valve to the first position, and when the fan air valve is in the first open position, bleeding the bypass air through a bypass outlet of the precooler into the core compartment to impinge on the gas turbine engine case assembly proximate a turbine section of the core compartment, thereby cooling the core compartment and the gas turbine engine case assembly.

2. The method of claim 1, further comprising moving the fan air valve to a closed position to inhibit the provision of bypass air through the fan air valve inlet to the bypass inlet, in response to the core compartment temperature satisfying the target core compartment temperature.

3. The method of claim 1, further comprising moving the fan air valve to a second open position to facilitate the provision of bypass air through the fan air valve inlet to the bypass inlet, in response to the pressure regulating/shut-off valve being in an open position, a bleed air conduit having the pressure regulating/shut-off valve operatively connected to the bleed air inlet of the precooler and a compressor section of the gas turbine engine core.

4. The method of claim 3, wherein the second open position of the fan air valve is based on a temperature of bleed air supplied through the bleed air conduit.

5. The method of claim 1, wherein the target core compartment temperature is based on at least one of a gas turbine engine rotational speed, an altitude, an aircraft mach number, and an ambient air temperature.

6. The method of claim 5, wherein the gas turbine engine rotational speed is based on a rotational speed of at least one of a low pressure shaft and a high pressure shaft.

7. A method of cooling a gas turbine engine case assembly, comprising:
    estimating a core compartment temperature based on at least one of a gas turbine engine rotational speed and an ambient air temperature;
    calculating a target core compartment temperature of a core compartment;
    comparing the estimated core compartment temperature to the target core compartment temperature, in response to a pressure regulating/shut-off valve operatively connected to a bleed air inlet of a precooler being in a closed position;
    calculating a fan air valve position of a fan air valve operatively connected to the precooler based on the target core compartment temperature, in response to the estimated core compartment temperature being greater than the target core compartment temperature;
    moving the fan air valve to the calculated fan air valve position; and
    when the fan air valve is in the calculated fan air valve position, bleeding bypass air from the precooler into the core compartment, to impinge on the gas turbine engine case assembly proximate a turbine section of the core compartment, thereby cooling the core compartment and the gas turbine engine case assembly, at least until the estimated core compartment temperature satisfies the target core compartment temperature.

8. The method of claim 7, further comprising:
    closing the fan air valve in response to the estimated core compartment temperature becoming less than the target core compartment temperature.

* * * * *